United States Patent [19]

Mong et al.

[11] 4,099,543
[45] Jul. 11, 1978

[54] VENTED BALL TYPE ANGLE COCK

[75] Inventors: William K. Mong, North Huntingdon; Michael T. Zoric, North Versailles, both of Pa.

[73] Assignee: Westinghouse Air Brake Company, Wilmerding, Pa.

[21] Appl. No.: 801,683

[22] Filed: May 31, 1977

[51] Int. Cl.² .............................................. F16K 11/06
[52] U.S. Cl. ..................... 137/625.22; 137/625.24; 251/315
[58] Field of Search ............... 137/625.22, 625.24; 251/315

[56] References Cited

U.S. PATENT DOCUMENTS

| | | | |
|---|---|---|---|
| 3,464,449 | 9/1969 | Morton | 137/625.24 |
| 3,770,016 | 11/1973 | Johnstone | 137/625.22 |

Primary Examiner—Alan Cohan
Attorney, Agent, or Firm—W. F. Poore; R. W. McIntire, Jr.

[57] ABSTRACT

This invention relates to a vented ball-type angle cock for use at each end of the brake pipe on a railway vehicle in which the brake pipe hose connected to the angle cock outlet is vented to atmosphere in the cock closed position via a drilled passageway extending through the ball valve, a guide bushing carried by the ball valve, and a trunnion on one end of which is rotatably supported the bushing, the opposite end of this trunnion being supported on the bottom of the cavity in the angle cock body in which the ball valve is so disposed that in its open position a communication is established between the brake pipe and the hose that is connected to the hose at the adjacent end of the brake pipe on the next car in a train.

10 Claims, 5 Drawing Figures

VENTED BALL TYPE ANGLE COCK

BACKGROUND OF THE INVENTION

In U.S. Pat. No. 1,929,174, issued Oct. 3, 1933 to George Lasco, there is shown a brake pipe angle cock having a tapered-type cock key that is provided with a longitudinally disposed tapered groove on its larger end which groove, in the closed position of the key, establishes a communication between the interior of an air brake hose connected to the outlet end of the angle cock body and atmosphere via this groove and a bore that extends through the cock body from the wall surface of a tapered bore in the body in which the tapered-type key is rotatably mounted to the exterior surface of this body. Thus, the fluid under pressure in the air brake hose is vented to atmosphere via this communication when the cock key is rotated to a closed position in which communication between the interior of the brake pipe and the interior of the hose is cut off.

In U.S. Pat. No. 3,498,585, issued Mar. 3, 1970 to Fred Temple et al, and assigned to the assignee of the present invention, there is shown a ball-type angle cock that constitutes a part of the freight car brake apparatus provided on the majority of freight cars owned and operated by American railroads.

Many American railroads on certain of their freight cars require an angle cock that, when in its closed position, establishes a communication between the interior of the air brake hose connected to the outlet end of the angle cock body and atmosphere. However, the ball-type angle cock disclosed in the above-mentioned U.S. Pat. No. 3,498,585, is not provided with such a communication between the interior of the air brake hose and atmosphere.

Accordingly, it is the general purpose of this invention to provide a ball-type angle cock having novel means for venting fluid under pressure from the interior of an air brake hose connected to the outlet of such an angle cock upon turning the handle of the angle cock to its closed position in which communication between the brake pipe and the interior of this air brake hose is closed.

SUMMARY OF THE INVENTION

According to the present invention, a novel ball-type angle cock comprises a hollow cock body in which is disposed a ball-type valve provided with a guide bushing that is rotatably mounted on one end of a trunnion that has its opposite end anchored in the bottom of the hollow body. The ball-type valve and the bushing are provided with coextensive drilled passageways that, when the ball-type valve is turned to its valve-closed position, establish a communication with a passageway in the trunnion that is open to atmosphere. The communication thus established enables the release of all fluid under pressure from the interior of an air brake hose connected to the outlet of the angle cock body prior to uncoupling the coupling at the exterior end of the hose from a like coupling at the exterior end of the hose at the adjacent end of the next vehicle in a train of railway vehicles.

DESCRIPTION

Figure 1:
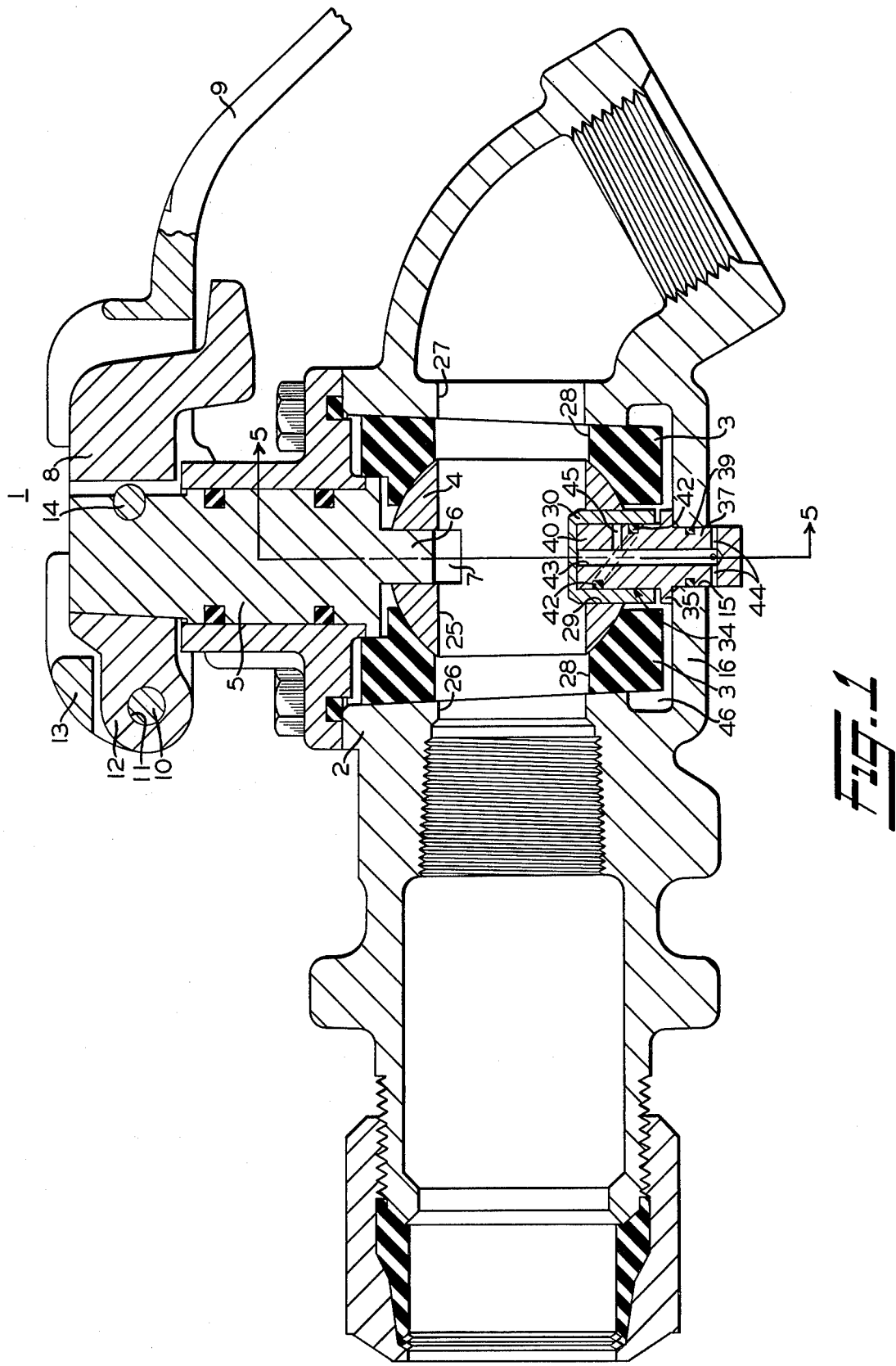
FIG. 1 is a longitudinal cross-sectional view of a ball-type angle cock showing the ball-type valve in its valve-open position.

As shown in the drawings, a ball-type angle cock is denoted by the reference numeral 1. This angle cock 1 comprises a hollow housing or body 2, a pair of identical resilient ball seat seals 3 disposed within the hollow body 2, a ball-type valve 4 mounted for rotation within the seals 3, a cock key or valve stem 5 that has a tongue 6 at one end that extends into slot or groove 7 provided therefor in the ball valve 4, a handle socket 8 through which extends the other end of the key 5, and a handle 9. This handle 9 is pivotally mounted on a pin 10 that extends through a bore 11 in a lug 12 that is integral with one side of the handle socket 8 and a pair of coaxial bores provided in the arms of a clevis 13 which is integral with one end of the handle 9. The handle socket 8 is rigidly secured to the cock key 5 by a rivet 14 thereby enabling rotation of the handle socket 8, cock key 5 and ball valve 4 by means of the handle 9 between an open position in which the ball valve 4 is shown in FIG. 1 and a closed position.

The ball seat seals 3 may be the same as those shown and described in the above-mentioned U.S. Pat. No. 3,498,585 and, therefore, need not be described in detail herein.

The hollow body 2 may be a casting that is identical to the casting constituting the hollow body of the ball-type angle cock shown in the above-mentioned U.S. Pat. No. 3,498,585 except modified in a manner that will now be described.

Thus, angle cocks now in service on the rolling stock of American railroads may be modified to provide a vented ball-type angle cock.

Subsequent to removing the casting constituting the hollow body 2 from the mold in which it is cast in a foundry, a bore 15 is formed, as for example, by a drilling operation, in the bottom 16 of this body 2.

Next, a pair of parallel spaced-apart flat surfaces 17 and 18 are formed, as by a machining operation, on one side of a pair of inwardly extending lugs 19 and 20 that are formed integral with and extend upward from the bottom 16. These lugs 19 and 20 and the surfaces 17 and 19 thereon are shown in FIG. 4 from which it is apparent that the surface 17 is somewhat further from the longitudinal center line of the body 2 than the surface 18.

After forming the flat surfaces 17 and 18 on the lugs 19 and 20, a pair of arcuate surfaces 21 and 22 are formed on these lugs, these arcuate surfaces 21 and 22 being formed by such as, for example, being cast thereon or by a circular milling machine cutter or some similar tool.

Figure 4:
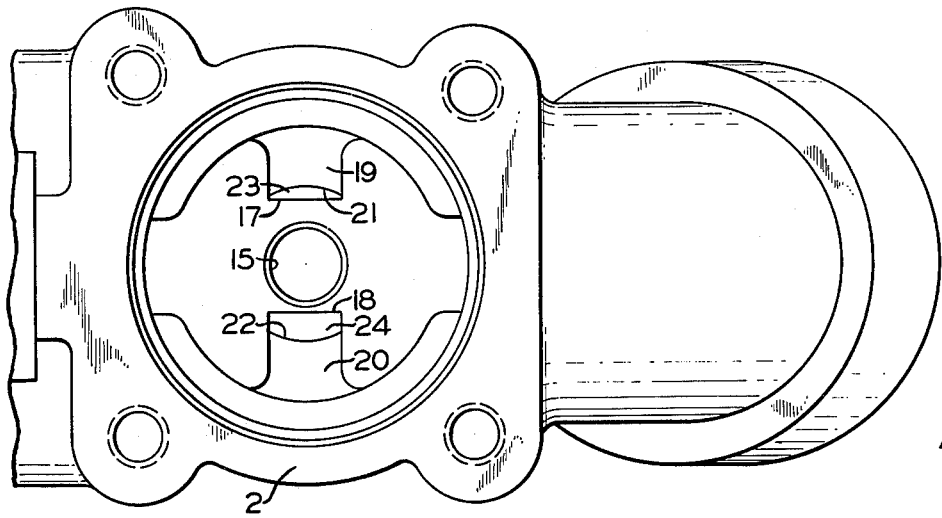
FIG. 4 is a top view of the angle cock body with the ball removed and showing a slot and a bore in the body for receiving the trunnion shown in FIGS. 2 and 3.

It may be noted from FIG. 4 that the flat surface 17 and the arcuate surface 21 form therebetween a flat surface or first shoulder 23, and the flat surface 18 and the arcuate surface 22 form therebetween a flat surface or second shoulder 24, it being noted from FIG. 4 that the area of the flat surface constituting this second shoulder 24 is somewhat greater than the area of the flat surface constituting the first shoulder 23.

As shown in FIG. 1 of the drawings, the ball valve 4 is provided with a circular passageway 25 that extends therethrough. When the ball valve 4 is rotated by means of the handle 9 through an angle of 90° from its closed position to its open position in which it is shown in FIG. 1, this passageway 25 establishes a communication between an inlet passageway 26 in the body 2 and an outlet passageway 27 in this body, it being noted that each of the ball seat seals 3 is provided with a bore 28 that is coaxial with the circular passageway 25 in the ball valve 4 while this ball valve occupies its open position.

One end of the usual brake pipe (not shown) that extends from end to end of a railway vehicle is connected to the inlet passageway 26 and one end of the usual air brake hose (not shown) is connected to the outlet passageway 27. Accordingly, it is apparent that while the ball valve 4 occupies its open position, as shown in FIG. 1, fluid under pressure may flow from the brake pipe to the interior of the air brake hose. The other end of this air brake hose is provided with a coupling that is coupled to a like coupling on one end of a like air brake hose that is connected to the outlet passageway of the angle cock secured to the adjacent end of the brake pipe that extends from end to end of the next vehicle in the train, it being understood that the adjacent ends of two adjacent railway vehicles are coupled by the couplers at these adjacent ends of the two adjacent railway vehicles.

Figure 5:
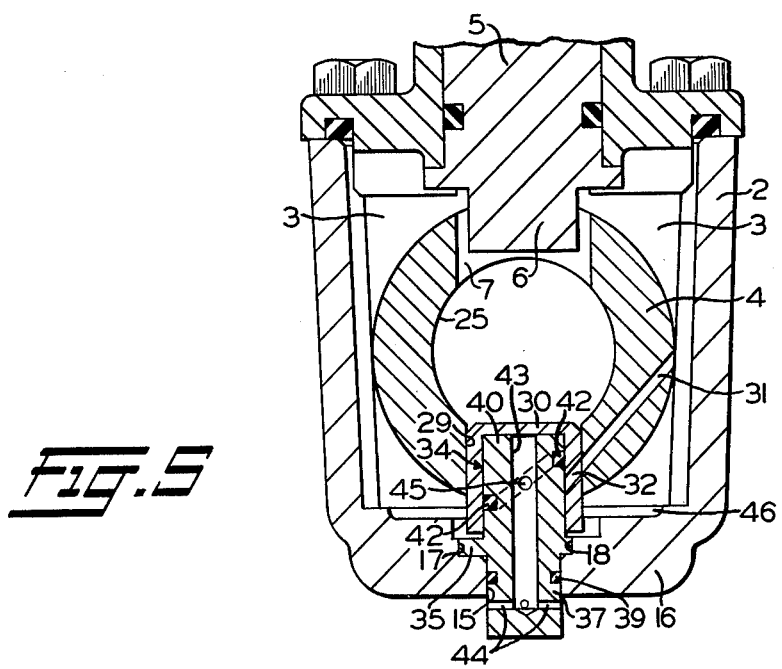
FIG. 5 is a vertical cross-sectional view, taken along the line 5—5 of FIG. 1 and looking in the direction of the arrows, showing further structural details of the ball-type angle cock not made apparent in FIG. 1.

Referring to FIG. 5 of the drawings, it will be noted that the ball valve 4 is provided, as by a driling operation, with a bore 29, the axis of this bore 29 forming a right angle with the axis of the circular passageway 25 in this ball valve 4. A cup-shaped guide bushing 30 is pressed into the bore 29 it being noted that the length of this bushing is such that its open end extends outside of the ball valve 4.

Subsequent to pressing the guide bushing 30 into the ball valve 4 to the position in which this bushing 30 is shown in FIG. 5 with respect to the ball valve 4, a pair of coaxial bores 31 and 32 that extend through the ball valve 4 and the cup-shaped bushing 30 respectively are formed as, for example, by a drilling operation in this ball valve and bushing.

Figure 2:
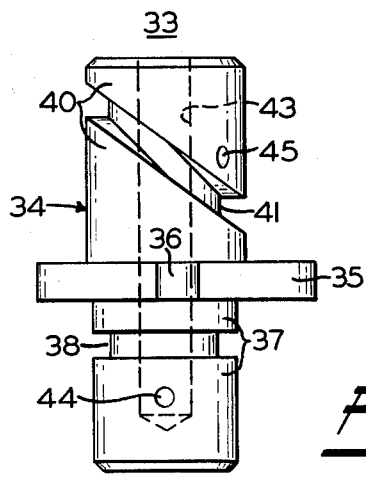
FIG. 2 is an elevational view, on an enlarged scale, of a trunnion on which the ball-type valve shown in FIG. 1 is rotatably mounted.
Figure 3:
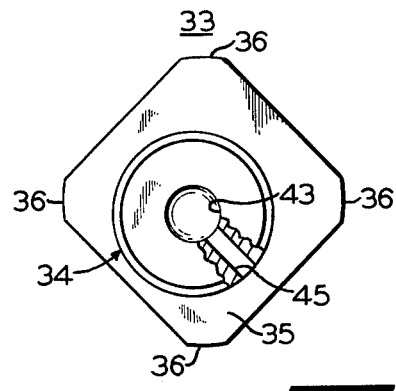
FIG. 3 is a top view of the trunnion shown in FIG. 2.

In order that the ball valve 4 and the cup-shaped bushing 30 may be rotatably mounted in the hollow body 2 between the two ball seat seals 3, the angle cock 1 is provided with a trunnion 33 the details of which are shown in FIGS. 2 and 3.

The trunnion 33 comprises a cylindrical member 34 that has formed integral therewith intermediate the ends thereof an out-turned flange 35 that, as can be seen from FIG. 3, constitutes a square each corner of which is removed so as to form on this flange four arcuate segments 36.

Moreover, as is apparent from FIG. 3, this square constituting the out-turned flange 35 is off-set with respect to the cylindrical member 34. The size of this square is such as to enable the out-turned flange 35 to be disposed between the flat surfaces 17 and 18 on the lugs 19 and 20 (FIG. 4) so that its lower side abuts the upper side of the bottom 16 of the body 2 when a lower cylindrical portion 37 of the cylindrical member 34 is disposed in the hereinbefore-mentioned bore 15 that extends through the bottom 16 of the body 2.

As shown in FIG. 2, the lower cylindrical portion 37 of the cylindrical member 34 is provided intermediate its ends with a peripheral annular groove 38 for receiving therein an O-ring seal 39 which, as shown in FIG. 1, forms a seal with the wall surface of the bore 15 to prevent leakage of fluid under pressure from the interior of the hollow body 2 to atmosphere.

As is further shown in FIG. 2, the cylindrical member 34 is provided above the out-turned flange 35 with an upper cylindrical portion 40 on which is formed, as by a machining operation, an inclined or diagonal groove 41 for receiving therein an elliptical seal member 42 that, as shown in FIGS. 1 and 5, forms a seal with the inside wall surface of the cup-shaped bushing 30.

Referring to FIGS. 2 and 3 of the drawings, it will be seen that the cylindrical member 34 is provided with a bottomed bore 43 that extends through the upper cylindrical portion 40, the out-turned flange 35 and substantially half way through that portion of the lower cylindrical portion 37 that is below the groove 38 thereon.

Furthermore, the lower cylindrical portion 37 is provided with four drilled bores 44, only one of which appears in FIG. 2. These bores 44 are arranged arcuately about the cylindrical portion 37, and, as shown in FIGS. 1 and 2, are disposed below the bottom 16 of the body 2 so as to establish a communication between the interior of the bottomed bore 43 and atmosphere.

As shown in FIGS. 2 and 3, the upper cylindrical portion 40 of the cylindrical member 34 is provided with a bore 45 that at one end opens into the bottomed bore 43. This bore 45 is so located that, when the ball-type valve 4 is rotated by means of the handle 9 from the open position in which this ball-type valve 4 is shown in FIG. 1 through an angle of 90°, the other end of this bore 45 is in alignment with the lower end of the bore 32 in the bushing 30.

Therefore, when the ball-type valve 4 is rotated by means of the handle 9 from its open position to its closed position, the fluid under pressure in the outlet passageway 27 and the air brake hose connected thereto will flow to atmosphere via the bore 31 in the ball-type valve 4, the bore 32 in the bushing 30, and the bore 45, bottomed bore 43 and the four bores 44 in the cylindrical member 34 of the trunnion 33.

Thus, the hose couplings of two coupled hose at the adjacent ends of two railway vehicles in a train may be manually uncoupled without the trainman performing this work being subject to a blast of high pressure air from the two hose when their couplings are uncoupled.

It may be noted from FIGS. 1 and 2 that the elliptical seal member 42, which is disposed in the diagonal groove 41 formed on the cylindrical member 34 that constitutes the trunnion 33 about which the cup-shaped bushing 30 and ball-type valve rotate, is so disposed that any fluid under pressure that might leak from the passageway 25 in the ball valve 4 via the bore 29 into the bore 32 in the cup-shaped bushing 30 cannot flow from this bore 32 to atmosphere through the bottomed bore 43 and the four bores 44 in the cylindrical member 34 since this seal member 42 forms a seal with the interior wall surface of the bushing 30 which will prevent flow from the lower end of the bore 32 to the upper end of the bottomed bore 43.

Moreover, it should be noted from FIGS. 1 and 2 that if fluid under pressure leaks from the inlet passageway 26 past the ball seat seals 3 into a chamber 46 above the bottom 16 of the cock body 2, this fluid under pressure is prevented from flowing to atmosphere by the O-ring seal 39 which forms a seal with the wall surface of the bore 15 that extends through the bottom 16.

Finally, it should be noted from FIG. 5 that there is clearance between the tongue 6 of the cock key 5 and two sides of the groove 7 in ball-type valve 4. Consequently, it is apparent that the cock key 5 does not serve as a support for the ball-type valve 4 which is supported by the trunnion 33 that comprises the cylindrical member 34, the out-turned flange 35 integral therewith, and the two resilient ball seat seals 3.

Having now described the invention, what we claim as new and desire to secure by Letters Patent, is:

1. A ball-type angle cock comprising:
   a. a hollow housing having a pair of passageways opening thereinto to which may be connected respectively an inlet conduit and an outlet conduit,
   b. a pair of ball seat seals disposed in said hollow housing in opposite spaced-apart relationship and each having a through bore that at one end is in alignment with one end of one of said pair of passageways in said housing, the opposite end being provided with a spherical seat, wherein the improvement comprises:
   c. a ball valve element having a passageway therethrogh and so positioned between said ball seat seals in sealing relationship with said spherical seat on each respective ball seat seal as to, in an open position of said element, establish a communication between said inlet conduit and said outlet conduit, said ball valve element also having a pair of intersecting bores therein, one of said bores so intersecting said passageway that the axis thereof forms a right angle with the axis of said passageway,
   d. a valve stem rotatably mounted in said housing and separably connected to said ball valve element for effecting rotation of said element between said open position and a closed position in which said communication is closed,
   e. a bushing having a bore therein, said bushing being so disposed in said one bore in said ball valve element that one end of said bore in said bushing is in alignment with one end of the other of said pair of intersecting bores in said ball valve element, and
   f. a trunnion carried in said housing bore rotatably supporting thereon said bushing and having a passageway so extending therethrough that one end thereof is constantly open to atmosphere and the other end is in alignment with the other end of said bore in said bushing in only said closed position of said ball valve element whereby a venting communication is established between said outlet conduit and atmosphere.

2. A ball-type angle cock, as recited in claim 1, further characterized in that rotation of said ball valve element by said stem from said closed position to said open position closes said venting communication.

3. A ball-type angle cock, as recited in claim 1, further characterized in that said hollow housing is provided with a bore for receiving therein said trunnion, and said trunnion is provided intermediate its ends with an out-turned flange for abutting said hollow housing at one end of said bore in said housing whereby said out-turned flange so positions said other end of said passageway in said trunnion that said other end is in alignment with said other end of said bore in said bushing in only said closed position of said ball valve element.

4. A ball-type angle cock, as recited in claim 1, further characterized in that said bushing is cup-shaped and is press-fitted into said one bore in said ball valve element thereby enabling said bushing to rotatably support said ball valve element on said trunnion.

5. A ball-type angle cock, as recited in claim 3, further characterized in that said hollow hosing is provided on the interior thereof with means for anchoring said out-turned flange with respect to said housing.

6. A ball-type angle cock, as recited in claim 4, further characterized by sealing means carried by said trunnion and so disposed with respect thereto as to so form a seal with the interior of said cup-shaped bushing as to prevent flow to atmosphere of any fluid under pressure leaking from said passageway in said ball valve element to said other of said pair of intersecting bores via said one bore of said pair in which said bushing is press-fitted.

7. A ball-type angle cock, as recited in claim 4, further characterized by a first sealing means carried by said trunnion and so disposed with respect thereto as to so form a seal with the interior of said cup-shaped bushing as to prevent flow to atmosphere of any fluid under pressure leaking from said passageway in said ball valve element to said other of said pair of intersecting bores via said one bore of said pair in which said bushing is press-fitted, and a second sealing means carried by said trunnion and so disposed between said housing and said trunnion as to form a seal therebetween to prevent flow to atmosphere of any fluid under pressure leaking from said inlet and outlet conduits past said pair of ball seat seals.

8. A ball-type angle cock, as recited in claim 6, further characterized in that said trunnion is provided with a groove for receiving therein said sealing means, said groove being disposed at an acute angle with respect to the axis of said trunnion.

9. A ball-type angle cock, as recited in claim 7, further characterized in that said trunnion is provided with a first groove for receiving therein said first sealing means, said first groove being disposed at an acute angle with respect to the axis of said trunnion, and with a second groove for receiving therein said second sealing means, said second groove being spaced apart along said axis from said first groove and so disposed as to form an angle of 90° with said axis.

10. A ball-type angle cock, as recited in claim 9, further characterized in that said first and second grooves on said trunnion are so arranged thereon that both are disposed between the respective opposite ends of said passageway in said trunnion whereby neither sealing means prevents flow of fluid under pressure to and from said passageway.

* * * * *